US010001646B2

(12) United States Patent
Ando et al.

(10) Patent No.: US 10,001,646 B2
(45) Date of Patent: Jun. 19, 2018

(54) HEAD-UP DISPLAY

(71) Applicant: DENSO CORPORATION, Kariya, Aichi-pref. (JP)

(72) Inventors: Hiroshi Ando, Nagoya (JP); Makoto Sakai, Kitanagoya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 14/710,941

(22) Filed: May 13, 2015

(65) Prior Publication Data

US 2015/0331239 A1 Nov. 19, 2015

(30) Foreign Application Priority Data

May 14, 2014 (JP) .................. 2014-100432

(51) Int. Cl.
*G02B 27/01* (2006.01)
*G02B 26/10* (2006.01)

(52) U.S. Cl.
CPC .............. *G02B 27/01* (2013.01); *G02B 26/10* (2013.01); *G02B 27/0101* (2013.01); *G02B 2027/011* (2013.01); *G02B 2027/014* (2013.01)

(58) Field of Classification Search
CPC ................ G02B 27/01; G02B 27/0101; G02B 27/0149; G02B 27/017; G02B 27/0175; G02B 27/0179; G02B 2027/011; G02B 2027/014; G02B 26/10; G06T 19/006; H04N 13/044; H04N 5/7491

USPC ...... 359/13–14, 618, 629–633, 196.1–226.3; 345/7–9, 632–633; 348/113–120; 349/11
See application file for complete search history.

(56) References Cited

U.S. PATENT DOCUMENTS

| 7,535,613 B2 * | 5/2009 | Baik .................... G02B 26/105 347/233 |
| 2005/0157398 A1 | 7/2005 | Nagaoka et al. |
| 2013/0050655 A1 * | 2/2013 | Fujikawa ........... G02B 27/0101 353/38 |

FOREIGN PATENT DOCUMENTS

| JP | 11-30764 A2 | 2/1999 |
| JP | 2009-163122 A2 | 7/2009 |
| JP | 5050862 B2 | 10/2012 |

* cited by examiner

*Primary Examiner* — Ricky Mack
*Assistant Examiner* — Kristina Deherrera
(74) *Attorney, Agent, or Firm* — Posz Law Group, PLC

(57) ABSTRACT

A head-up display includes a concave mirror actuator that changes, based on external instructions, a reflection angle by which a concave mirror reflects display light. A drawing unit includes a beam generator, a scanner, an optical actuator, and a controller, The beam generator emits a beam, and the scanner scans the beam in two dimensions by moving a reflection surface to draw an image. The optical actuator changes an angle of incidence of when the beam is emitted to the scanner. The controller drives the optical actuator to change the angle of incidence such that display light distortions generated at the concave mirror are offset by display light distortions generated at the scanner.

2 Claims, 9 Drawing Sheets

FIG. 4A (ANGLE OF INCIDENCE: 0deg)

SCANNING TRACK

VIRTUAL IMAGE

FIG. 4C (ANGLE OF INCIDENCE: 37deg)

SCANNING TRACK

VIRTUAL IMAGE

HEAD-UP DISPLAY

CROSS REFERENCE TO RELATED APPLICATIONS

This application is based on and incorporates herein by reference Japanese Patent Application No. 2014-100432 filed on May 14, 2014.

TECHNICAL FIELD

The present disclosure relates to a head-up display that projects display light to a projection member.

BACKGROUND

In a head-up display, when an image displayed by a display unit is expanded by a concave mirror and the like so as to be displayed, it is understood that by producing an image with the display unit such that distortions in the image are offset, an image with reduced distortion may be provided to a user (refer to, e.g., JP 5050862B).

In the above-described head-up display, if the display position of the image is to be changed, various configurations are available for changing an angle of the concave mirror. However, there is a concern that the image may become distorted if the angle of the concave mirror is changed.

In view of the above, for a head-up display that projects a display light to a projection member, it would be preferable to reduce distortion in an image even when an angle of a concave mirror is changed.

SUMMARY

The present disclosure relates to a head-up display that projects display light to a projection member. The head-up display includes a beam generator that emits a beam of light as the display light, a scanner including a moveable reflective surface, the scanner receiving the display light from the beam generator and scanning the display light, an optical actuator that integrally rotates the beam generator and the scanner to change a scanner angle of incidence of the display light at the scanner, a screen that receives the display light from the scanner and reflects the display light, a concave mirror that receives the display light from the screen and reflects and expands the display light to the projection member, a concave mirror actuator that changes, based on external instructions, a concave mirror angle of incidence of the display light at the concave mirror by rotating the concave mirror, and a controller including a CPU and a memory. The display light travels between the beam generator, the scanner, the screen, the concave mirror, and the projection member substantially along a common plane. The controller is programmed to drive, based on the concave mirror angle of incidence, the optical actuator to change the scanner angle of incidence such that display light distortions generated at the concave mirror are offset by display light distortions generated at the scanner.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIGS. 4A, 4B, 4C, and 4D show an overview of image distortion generated by a concave mirror.

DETAILED DESCRIPTION (First Embodiment)

Figure 1:
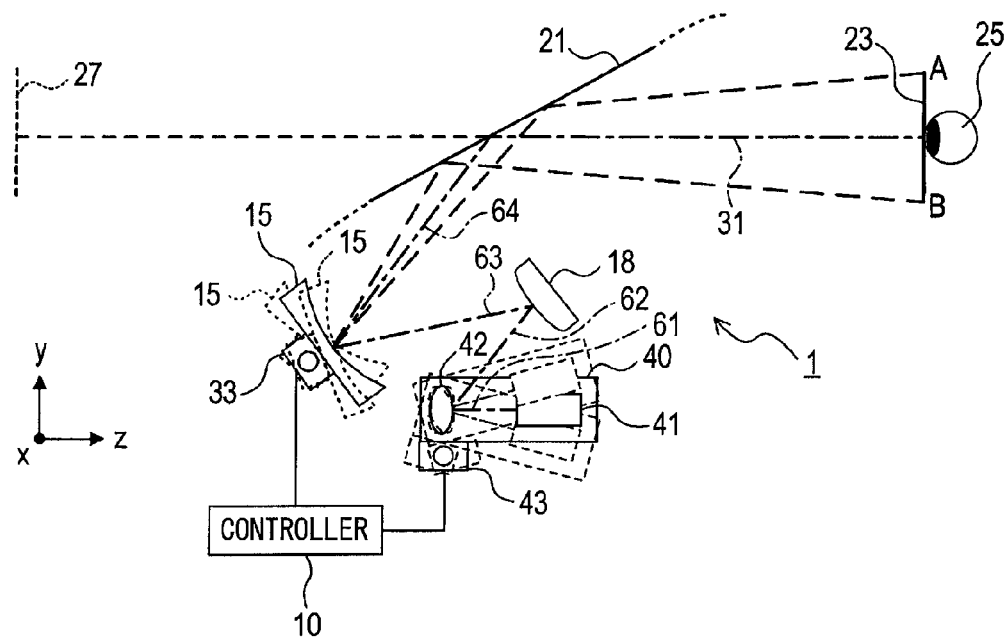
FIG. 1 is a side view of the schematic structure of a head-up display according to an aspect of the present disclosure.

A head-up display 1 according to the present disclosure may be, e.g., mounted in a vehicle. As illustrated in FIG. 1, the head-up display 1 includes a controller 10, a concave mirror 15, a screen 18, a concave mirror actuator 33, a drawing unit 40, and an optical actuator 43. In FIG. 1, the optical axis 31 is a schematic representation of the center of the optical path taken by an image displayed from the screen 18.

The drawing unit 40 includes a beam generator 41, a scanner 42, and the optical actuator 43. The beam generator 41 generates a beam of light as, e.g., a laser, and illuminates the beam onto the scanner 42.

The scanner 42 may be a MEMS (Micro Electro-Mechanical System) type micro mirror device which, using a beam input thereto at a given angle of incidence (i.e., a scanner angle of incidence), scans the beam along two orthogonal axes by moving a moveable reflective surface. In the configuration illustrated in FIG. 1, the scanner 42 would scan the beam in two dimensions: a top-down direction in FIG. 1, as well as in a direction into and out of the plane of FIG. 1. In other words, the scanning occurs along a direction orthogonal to the plane of FIG. 1.

As illustrated in FIG. 1, the optical actuator 43 is a motor or the like that changes an angle of the drawing unit 40. Accordingly, the optical actuator 43 drives the drawing unit 40 to change the angle of incidence of the beam with respect to the scanner 42.

The drawing unit 40 outputs an image as display light, which visually forms an image on a surface (diffusion region) of the screen 18. This image is reflected and expanded by the concave mirror 15 and projected onto a windshield (projection member) 21 of a vehicle. Here, the concave mirror 15 is a typical concave mirror as would be understood by a person of ordinary skill in the art.

Thereafter, using the windshield 21 as an optical combiner, the image arrives at a viewpoint 25 of a driver (passenger). The viewpoint 25 is positioned within an eye zone 23. Here, the driver is able to see the image as a virtual image (virtual display image) 27 positioned at a point beyond the windshield 21.

The eye zone 23 is an area where the driver is able to visually recognize the image. Further, the position of the viewpoint 25 can be adjusted according to the angle of the concave mirror 15. The angle of the concave mirror 15 is changed by the concave mirror actuator 33. Here, the concave mirror actuator 33 may include a motor, such as a stepper motor, and a gear assembly driven by the motor.

For example, if the angle of the concave mirror 15 in FIG. 1 is adjusted downward slightly from the position illustrated in solid lines, the viewpoint 25 of the driver will move upward to position A shown in FIG. 1. On the other hand, if the angle of the concave mirror 15 in FIG. 1 is adjusted upward slightly from the position illustrated in solid lines, the viewpoint 25 of the driver will move downward to position B shown in FIG. 1. In this manner, if a driver prefers a viewing position that is different from a default viewing position, the position of the viewpoint 25 may be adjusted according to the viewing position (sitting height) of the driver.

In the head-up display of FIG. 1, in order to minimize distortions in a direction into and out of the plane of FIG. 1 due to misaligned optics, the beam is preferably set to be emitted, scanned, and reflected along a common plane (a y-z plane). In other words, optical axes 61, 62, 63, and 64 illustrated in FIG. 1 are preferably set to be coplanar.

It should be noted that optical axes 61, 62, 63, and 64 are not necessarily exactly coplanar, and only need to be coplanar insofar as image distortions in the direction into and out of the plane of FIG. 1 are minimized so as to avoid causing discomfort to a human observer, i.e., such that a human observer is unable to clearly discern whether these distortions exist. Thereinafter, image distortions in a direction along the plane (i.e., the y-z plane) of FIG. 1 may be isolated and reduced in accordance with the preferred embodiments of the present disclosure as will be explained below.

Figure 2:
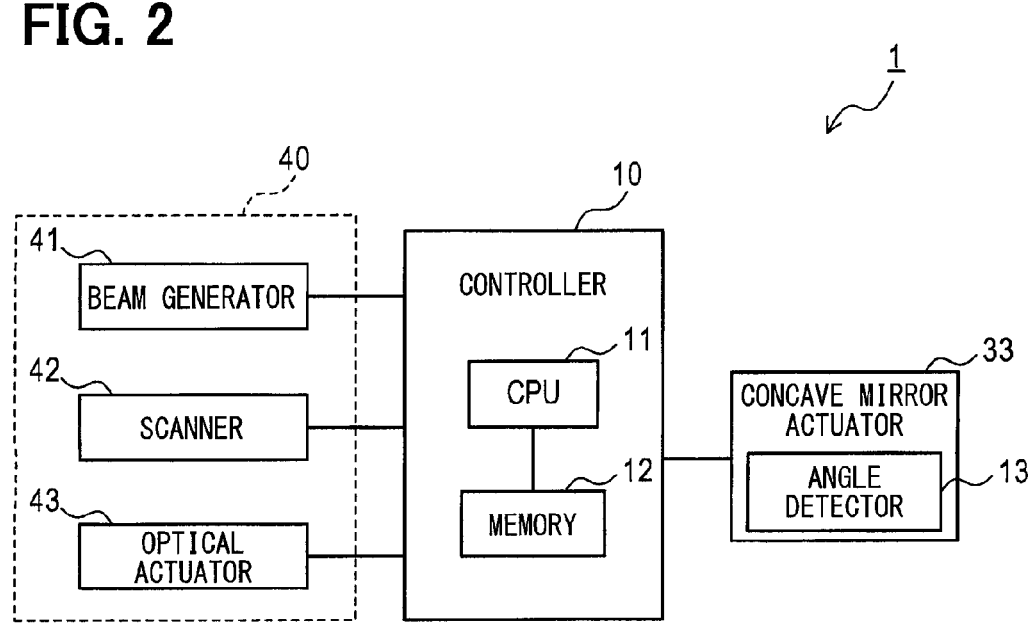
FIG. 2 is a block diagram of the schematic structure of the head-up display of FIG. 1.

FIG. 2 illustrates an exemplary configuration of electrical connections in the head-up display 1. As shown, the concave mirror actuator 33 includes an angle detector 13 that detects the angle of the concave mirror 15. The angle detector 13 may be an encoder which sends the detected angle as a signal to the controller 10.

The controller 10 includes a computer having a CPU 11 and a memory 12. Here, the memory 12 may be ROM, RAM, or the like. The controller 10 operates the drawing unit 40 to display an image on the screen 18.

In addition, when the controller 10 receives external instructions, such as user instructions to change the viewing position of the image by raising or lowering the viewpoint 25, the controller 10 operates the concave mirror actuator 33, based on the external instructions, to change the angle of the concave mirror 15.

To offset the image distortions generated at the concave mirror 15, the controller 10 drives and operates the optical actuator 43 to an appropriate angle. That is, the controller 10 drives and operates the optical actuator 43 to satisfy Equation (7) which will be discussed below.

FIGS. 3A, 3B and 4A-4D illustrate a relationship between image distortions generated at the scanner 42 and image distortions generated at the concave mirror 15. When a beam (incident light) is illuminated onto the scanner 42 and is reflected by the scanner 42 toward the center of the screen 18, the angle between the incident light and the emergent light is 2θ. Half of this angle, θ, is defined as the angle of incidence.

Figure 3A:
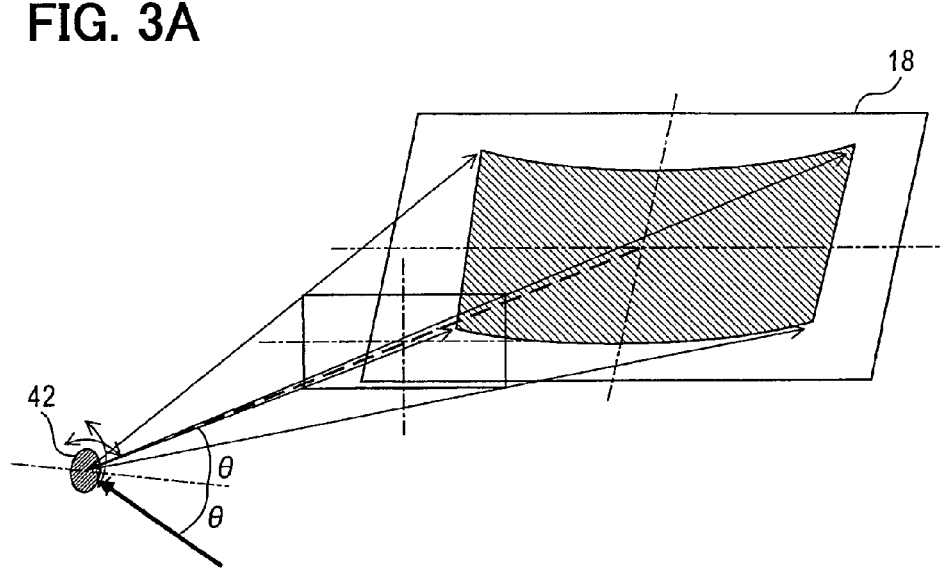
FIGS. 3A and 3B are views of an overview of image distortion generated by a scanner.
Figure 3B:
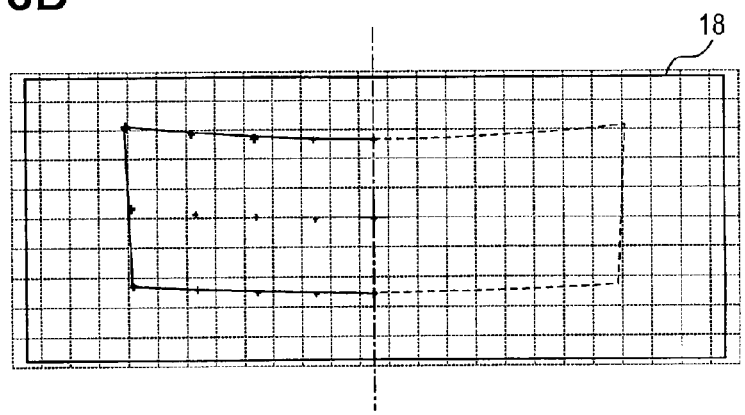

As illustrated in FIGS. 3A and 3B, when the angle of incidence θ increases, distortions are generated in the image being imaged on the screen 18. Specifically, the two ends of the image in the horizontal direction are distorted upward in the vertical direction. Whereas, not illustrated, at the concave mirror 15, distortions are generated such that the two ends of the image in the horizontal direction are distorted downward in the vertical direction. In other words, in the current embodiment, the image distortions generated at the scanner 42 are distorted in an opposite direction as the image distortions generated at the concave mirror 15.

Figure 4B:
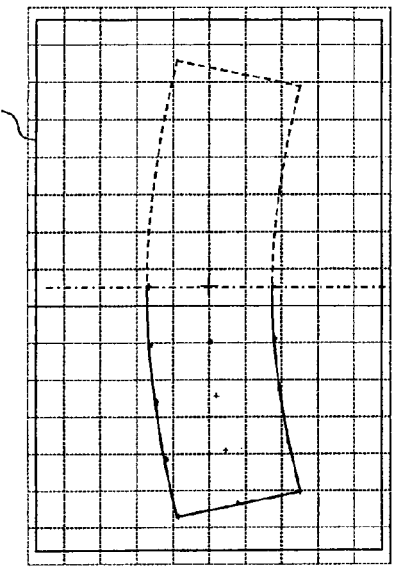
Figure 4B:
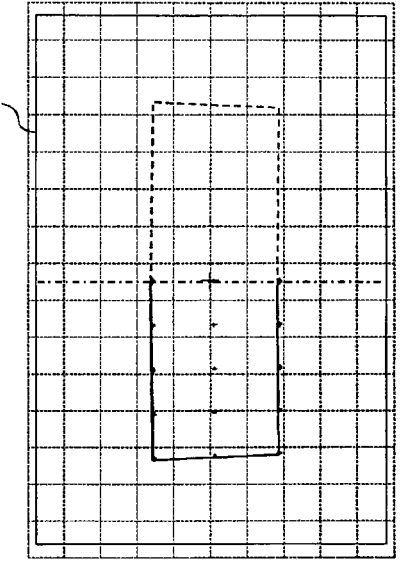

FIGS. 4A-4D illustrate a distortion cancelling mechanism based on the above described phenomenon. This distortion cancelling mechanism is used in the present embodiment as will be discussed further below. FIG. 4A shows a configuration where the angle of incidence θ into the scanner 42 is 0 degrees. As such, no distortions are present in the image scanned onto the screen 18. In this case, as shown in FIG. 4B, when the scanned light is reflected to the concave mirror 15 and is expanded thereby, substantially all of the image distortions generated by the concave mirror 15 remain in the resulting virtual image 27.

Figure 4D:
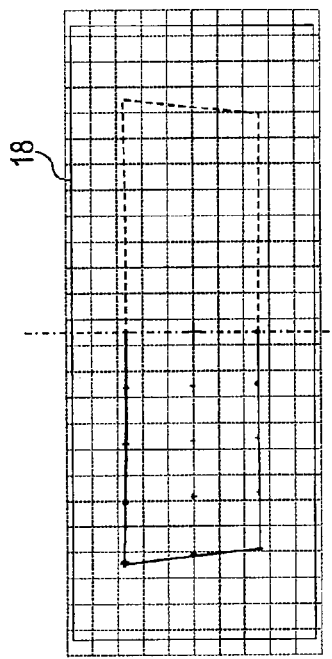
Figure 4D:
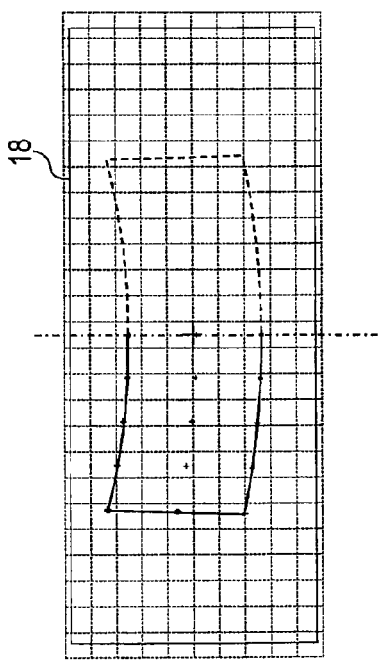

Conversely, FIG. 4C shows a configuration where the angle of incidence θ into the scanner 42 is 37 degrees. As such, upward image distortions are present in the image scanned on the screen 18. In this case, as shown in FIG. 4D, when the scanned light is reflected to the concave mirror 15 and is expanded thereby, image distortions generated by the concave mirror 15 are substantially cancelled out with image distortions generated by the scanner 42. As such, the virtual image 27 exhibits substantially no image distortions.

It should be noted that the above angles of incidence θ of 0 degrees and 37 degrees, as well as the various distortions shown in FIGS. 4A to 4D, are intended to be non-limiting examples, and are arbitrarily chosen to illustrate a distortion canceling mechanism used in the present embodiment.

Figure 5A:
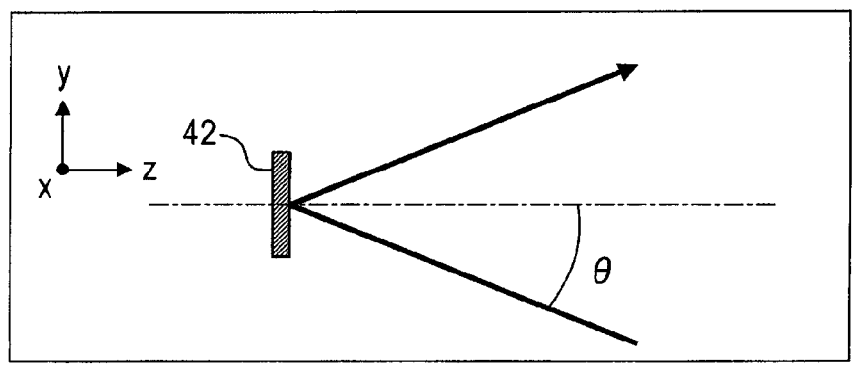
FIGS. 5A and 5B show first details of image distortion generated by the scanner of FIG. 3.

Hereinafter, these distortions will be described in general terms. FIG. 5A illustrates a configuration with an angle of incidence θ. For this situation, as illustrated in FIG. 5B, scanning in the horizontal direction (i.e, an x direction) will be considered.

Figure 5B:
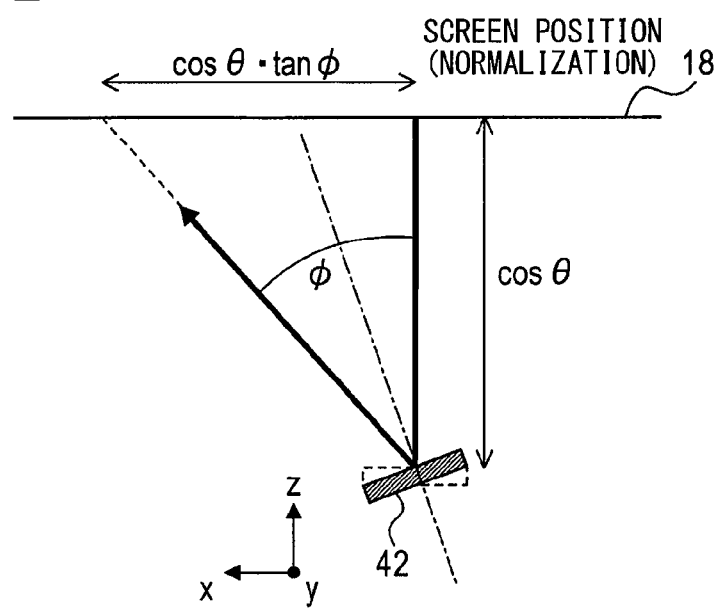
Figure 6A:
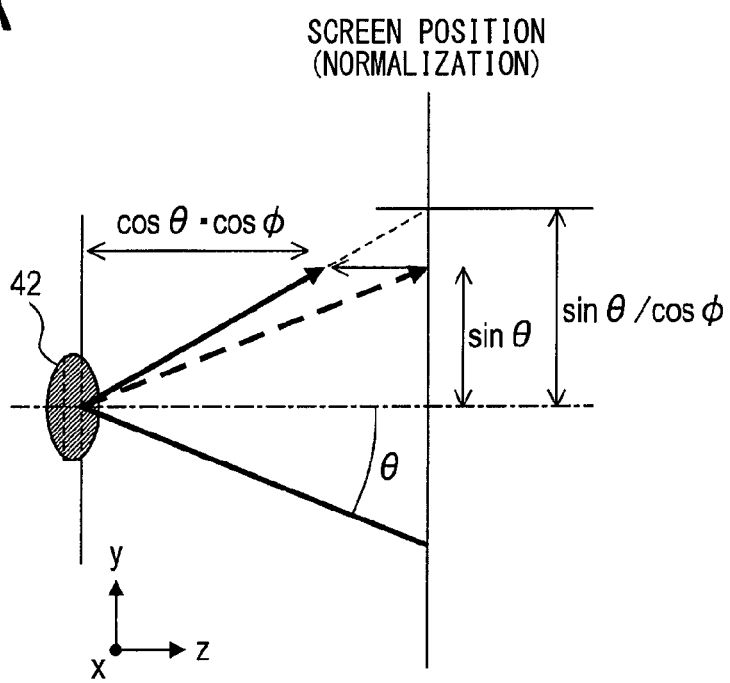
FIGS. 6A and 6B show second details of image distortion generated by the scanner of FIG. 3.

As illustrated in FIG. 5B, an angle between the incident light and the emergent light in the horizontal direction is a horizontal scanning angle φ. Further, FIG. 5B shows that if the distance to the screen 18 is normalized to a unit distance and represented as $\cos\theta$ then the horizontal dimension of imaged area is $\cos\theta * \tan\phi$. In addition, the dashed arrow in FIG. 6A shows that the vertical dimension of the imaged area is $\sin\theta$. However, due to distortions, the actual vertical dimension of the imaged area is extended. Specifically, the vertical dimension of the imaged area increases with the horizontal scanning angle φ. In this case the actual vertical dimension of the imaged area is $\sin\theta/\cos\phi$.

Figure 6B:
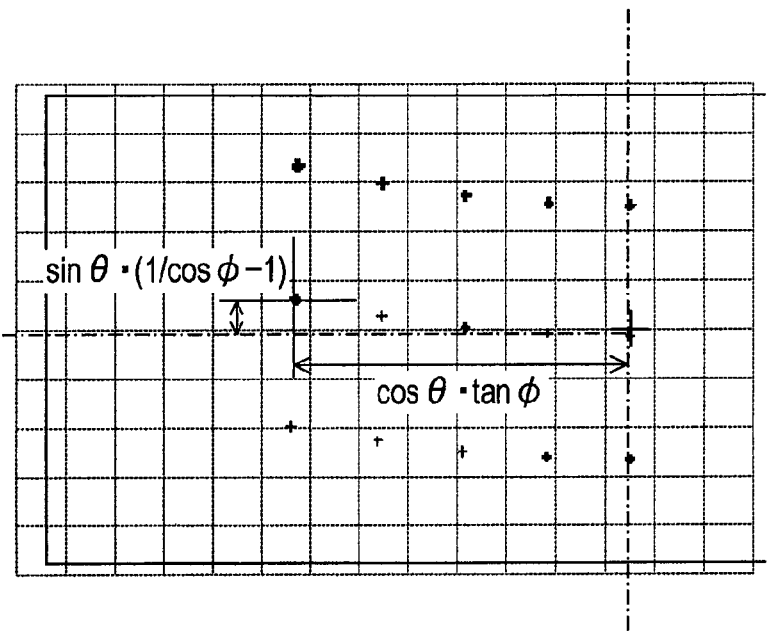

Accordingly, as illustrated in FIG. 6B, an amount of warp (distortion) ε generated by the scanner 42 increases as the angle of incidence θ increases. The amount of warp ε is defined as the change in the vertical dimension of the imaged area, which is $\sin\theta/\cos\phi$ minus $\sin\theta$, divided by the horizontal dimension of the imaged area, which is $\cos\theta * \tan\phi$. Simplified, the amount of warp ε is expressed in equation (1):

$$\varepsilon = \sin\theta \cdot (1/\cos\phi - 1)/(\cos\theta \cdot \tan\phi) \quad (1)$$

$$= \tan\theta \cdot (1 - \cos\phi)/\sin\phi$$

At the same time, as illustrated in FIGS. 7A-7B and 8A-8B, if an angle of incidence at the concave mirror 15

(i.e., a concave mirror angle of incidence) is α, and a radius of curvature of the concave mirror 15 is R, then an amount of warp γ in the virtual image 27 as viewed through the windshield 21 is considered.

Figure 7A:
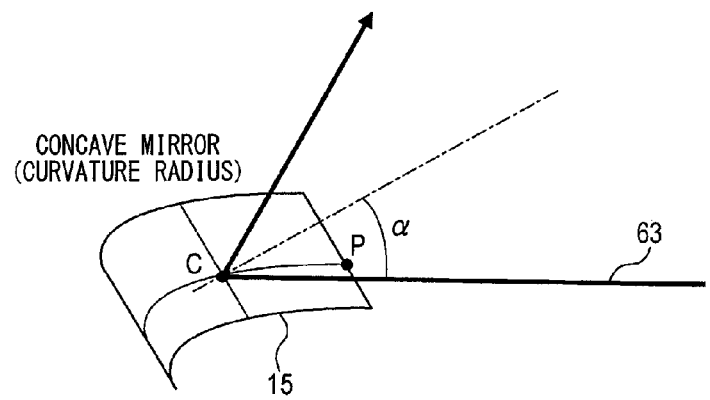
FIGS. 7A and 7B show first details of image distortion generated by the concave mirror of FIG. 4.

The beam, having been scanned by the scanner 42, strikes an area of the concave mirror 15. In FIG. 7A, a point C near the center of the concave mirror 15 is where the optical axis 63 of the scanned light strikes the concave mirror 15, and a point P at a distal portion of the concave mirror 15 is the edge of the scanned light striking the concave mirror 15. In other words, the scanned light spans, on one side of the point C, between the points C and P.

Figure 7B:
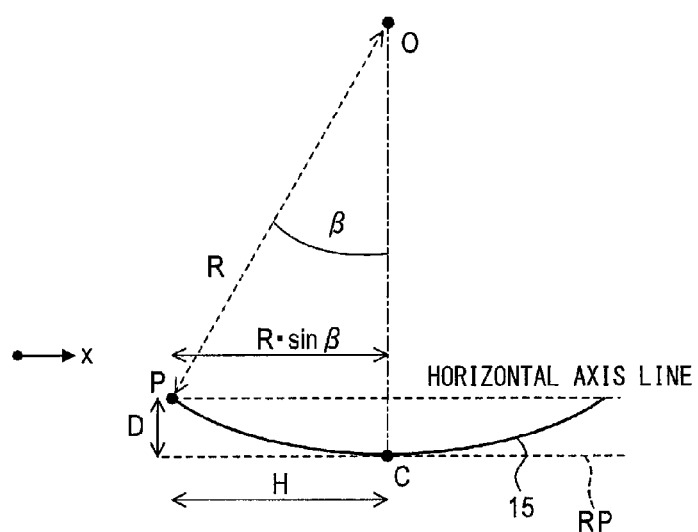

Further, FIG. 7B shows a schematic view of the concave mirror 15. Here, the horizontal direction (x direction) is the left to right direction in FIG. 7B. In FIG. 7B, point O is defined as the center of curvature of the concave mirror 15. In addition, an angle β is defined as the angle between a line connecting points O and P, and a line connecting points O and C. In this case, a distance H between point P and the horizontal center of the scanned light is expressed as R*sin β. Accordingly, the scanned light has a width of 2H in the horizontal direction at the concave mirror 15. Further, an offset height D is defined between the points P and C. In other words, the height D is measured from the point P to a reference plane RP tangential to the concave mirror 15 at the point C, as shown in FIG. 7B.

Figure 8A:
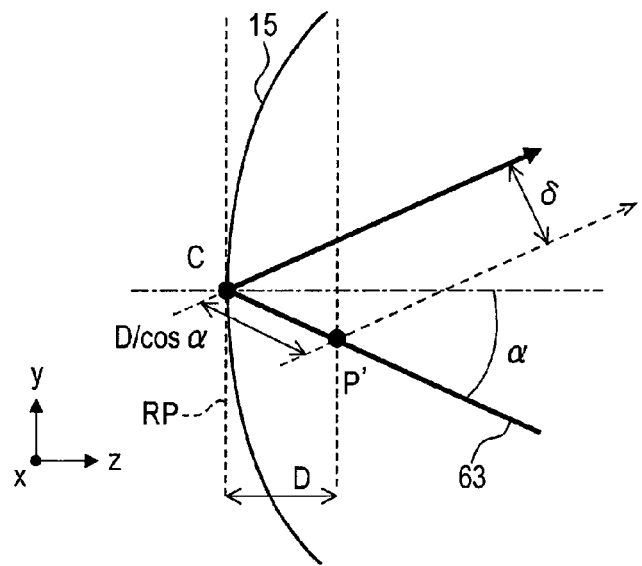
FIGS. 8A and 8B show second details of image distortion generated by the concave mirror of FIG. 4.

In FIG. 8A, the horizontal direction (x direction) is the direction into and out of the plane of paper. As illustrated in FIG. 8A, when the scanned light strikes the point C with the angle of incidence α, the optical axis 63 of the scanned light passes through a point P'. The point P' is a projection of the point P onto the optical axis 63, such that the point P' is also offset from the point C by the height D. In other words, the height D is also a distance between the point P' and the reference plane RP.

Here, the optical axis 63 of the scanned light passes through the point P' earlier than the point C, by a distance difference of D/cos α. As a result, an optical path gap δ exists between a hypothetical reflection of the scanned light at the point P' (shown as a dashed line) and the reflection of the scanned light at the point C (shown as a solid line). This optical path gap δ manifests as image distortions in the virtual image 27.

It should be noted that in the current embodiment, the scanned light is not actually reflected at the point P'. Instead, the point P' is a geometric representation used in measuring the amount of image distortion caused by the offset height D between the points P and C. In other words, although the optical path gap δ is measured between the reflections at the points P' and C, the optical path gap δ ultimately manifests due to the offset height D between the points P and C. Hereinafter, representation of the optical path gap δ is described in detail.

The height D may be derived as shown in FIG. 7B and is expressed in equation (2):

$$D = R \cdot (1 - \cos \beta) \qquad (2)$$

Here, the radius of curvature R of a typical concave mirror is sufficiently larger than the distance between points C and P that the following approximations, represented in equations (3) and (4), can be made:

$$\cos \beta = (1 - \sin^2 \beta)^{1/2} \approx 1 - \sin^2 \beta / 2 \qquad (3)$$

$$D = R \cdot \sin^2 \beta / 2 \qquad (4)$$

Given this approximation and the relationship between the optical path gap δ and the height D shown in FIG. 8A, the optical path gap δ can be expressed in equation (5):

$$\delta = D/\cos \alpha \cdot \sin 2\alpha \qquad (5)$$
$$= 2D \cdot \sin \alpha$$
$$= R \cdot \sin^2 \beta \cdot \sin \alpha$$

Figure 8B:
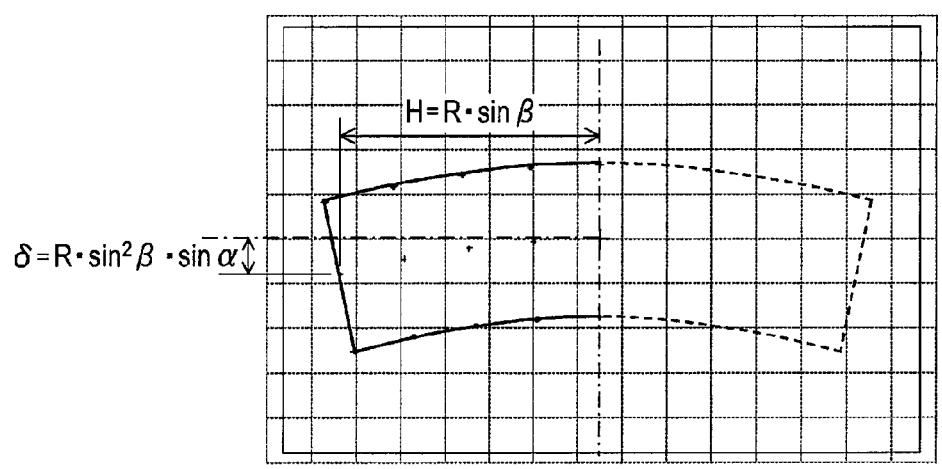

The above-described matters are summarized and illustrated in FIG. 8B. In other words, the amount of warp γ generated by the concave mirror 15 increases as the angle of incidence α at the concave mirror 15 increases. The amount of warp γ in this case is measured in the downward direction, and is equal to the optical path gap δ divided by the horizontal dimension of the imaged area, H (i.e., R*sin β). The amount of warp γ is expressed in equation (6):

$$\gamma = \delta/(R \cdot \sin \gamma) \approx \sin \alpha \cdot \sin \beta = \sin \alpha \cdot H/R \qquad (6)$$

In view of the above, the amount of warp γ generated by the concave mirror 15 and the amount of warp ε generated by the scanner 42 may be set to be equal in magnitude and opposite in direction. As a result, the amount of curved distortion in the virtual image 27 may be minimized. Here, since the above expression for warp ε is defined in the upward direction and the above expression for warp γ is defined in the downward direction, it is sufficient to set the two expressions to be equal to each other. In other words, the angle of incidence θ is set to satisfy equation (7):

$$\tan \theta \cdot (1 - \cos \phi)/\sin \phi \approx \sin \alpha \cdot H/R \qquad (7)$$

In equation (7), the terms φ, H, and R are known constants as explained above. Further, the angle of incidence α at the concave mirror is detected by the angle detector 13 and sent to the controller 10. Accordingly, the controller 10 is programmed to drive the optical actuator 43 to change the angle of incidence θ at the scanner 42 based on the above equation (7) (i.e., based on the angle of incidence α at the concave mirror 15), such that display light distortions generated at the concave mirror 15 are offset by display light distortions generated at the scanner 42.

In the head-up display 1 of the above described embodiment, even if the concave mirror 15 is rotated, the optical actuator 43 adjusts the angle of incidence θ at the scanner 42 with respect to the angle of incidence α at the concave mirror 15 to cancel out of the distortions generated at the concave mirror 15 with the distortions generated at the scanner 42 in the opposite direction. Accordingly, distortion of the display light can be suppressed.

(Second Embodiment)

In the above described embodiment, all distortions generated by the concave mirror 15 and the scanner 42 are considered and preferably suppressed. However, in a second embodiment of the present disclosure, it is contemplated that at a default viewpoint 25, distortions in the virtual image 27 may already be minimized or otherwise at a low level. For example, it is contemplated that the amount of image distortion at a default viewpoint 25 may be measured, e.g., at the time of manufacturing. Then, this default amount of image distortion may be corrected by software means or other optical means as would be understood by a skilled artisan. The default viewpoint 25 may be set in accordance with, e.g., an average driver sitting height.

However, even in such a case, a user may wish to change the default viewpoint due to, e.g., the user being taller than average, or simply due to the user's personal preference. If a user changes default viewpoint 25 to a different viewpoint through an operating device (not shown), the controller 10 controls the concave mirror driver 33 to adjust the angle of incidence α at the concave mirror 15 by rotating the concave mirror 15. As a result, the default angle of incidence α at the concave mirror 15 is disturbed, and new distortions will be generated at the concave mirror 15. In the second embodiment of the present disclosure, these new distortions are preferably isolated and reduced.

In the second embodiment, the default viewpoint 25 refers to a configuration where a default concave mirror angle of incidence at the concave mirror 15 is α and a default scanner angle of incidence at the scanner 42 is θ. At the default viewpoint 25, distortions in the virtual image 27 are already minimized as noted above. Here, when the angle of incidence α changes (e.g., due to rotating the concave mirror 15) by a first angle change Δα, the controller 10 operates the optical actuator 43 to change the angle of incidence θ. Specifically, the angle of incidence θ is changed by a second angle change Δθ such that image distortions caused by the first angle change Δα cancels out with image distortions caused by the second angle change Δθ.

Figure 9A:
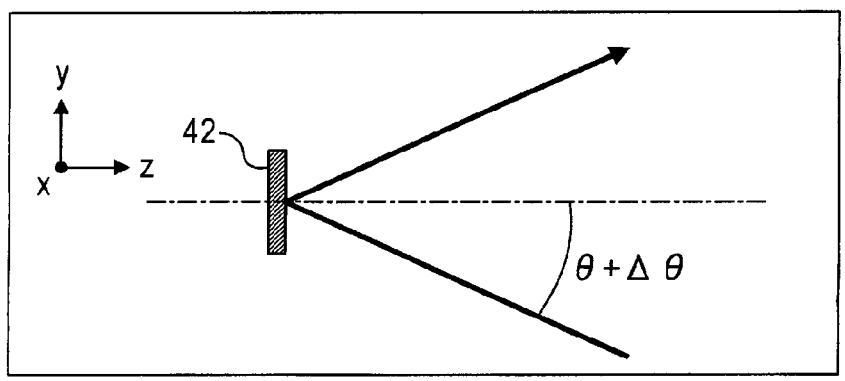
FIGS. 9A and 9B show first details of image distortion generated by the scanner of FIG. 3 according to a modified embodiment of the present disclosure.
Figure 9B:
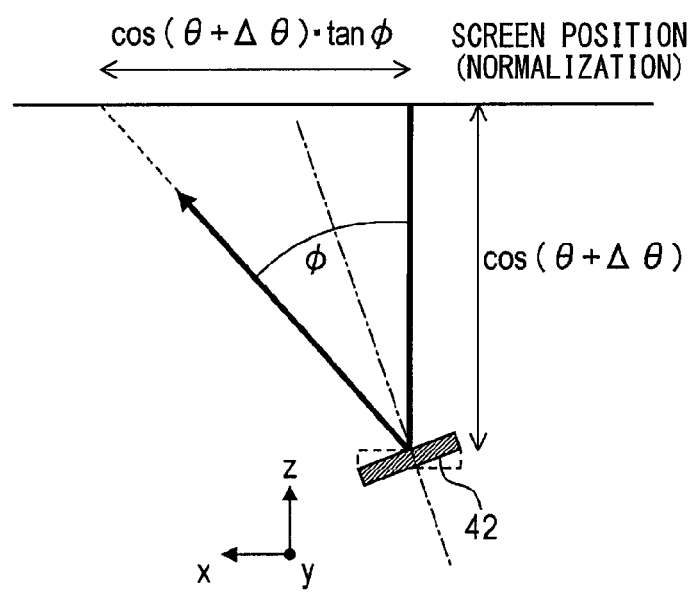
Figure 10:
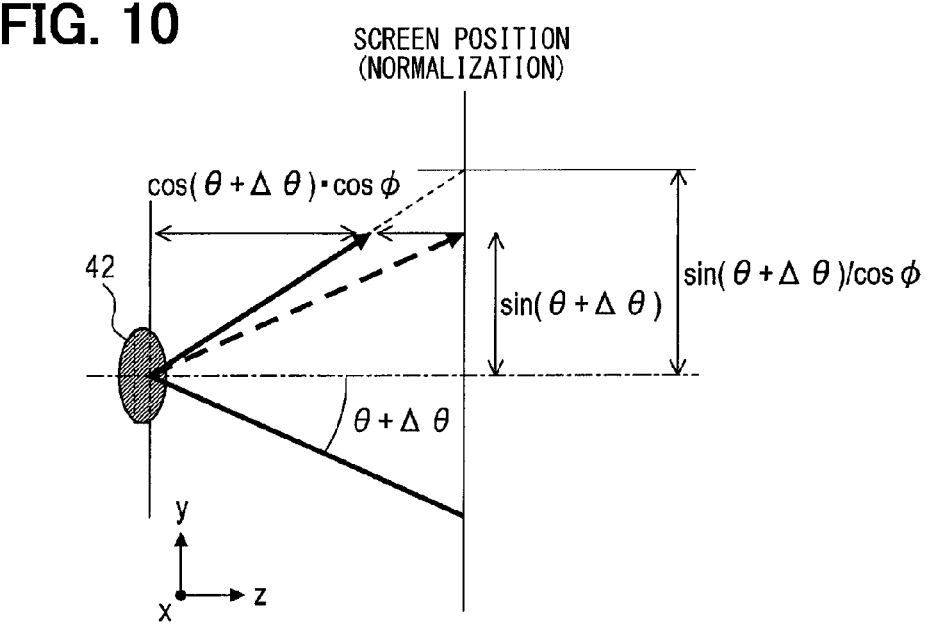
FIG. 10 shows second details of image distortion generated by the scanner of FIG. 3 according to the modified embodiment of the present disclosure.

Details of this operation are explained with reference to FIGS. 9A, 9B, and 10, which illustrate a case where the angle of incidence at the scanner 42 is θ+Δθ. In other words, the angle of incidence into the scanner 42 is adjusted by Δθ. From the first embodiment, it is understood that if the angle of incidence is θ, the amount of warp ε is expressed in equation (8):

$$\sin θ·(1/\cos φ-1)/(\cos θ·\tan φ)=\tan θ·(1-\cos φ)/\sin φ \qquad (8)$$

On the other hand, when the angle of incidence is θ+Δθ, the amount of warp is calculated by substituting θ+Δθ into the equations discussed above regarding the first embodiment. Applying the same explanations as those of the first embodiment except using θ+Δθ as the angle of incidence, the amount of warp ε is expressed in equation (9):

$$\tan(θ+Δθ)·(1-\cos φ)/\sin φ \qquad (9)$$

A difference A in the amount of warp ε, which is caused by changing the angle of incidence at the scanner 42 from "θ" to "θ+Δθ", is calculated by subtracting equation (8) from equation (9), and is expressed in equation (10):

$$(\tan(θ+Δθ)-\tan θ)·(1-\cos φ)/\sin φ \qquad (10)$$

Here, assuming that Δθ is a small angle (i.e., θ>>Δθ) and by using well known small angle approximations, equation (10) may be simplified to equation (11):

$$A=(Δθ/\cos^2 θ)·(1-\cos φ)/\sin φ \qquad (11)$$

A similar analysis is applied when the angle of incidence at the concave mirror 15 is changed from "α" to "α+Δα". Here, the amount of warp γ at the concave mirror 15, given an angle of incidence of α+Δα, is expressed in equation (12):

$$\sin(α+Δα)·H/R \qquad (12)$$

Further, as a result of changing the angle of incidence at the concave mirror 15 from "α" to "α+Δα", a difference B in the amount of warp γ is calculated by subtracting equation (6), which is described in the first embodiment, from equation (12). Additionally, when simplified by assuming that Δα is also a small angle, the difference B is expressed in equation (13):

$$(\sin(α+Δα)-\sin α)·H/R=Δα·\cos α·H/R \qquad (13)$$

Since the amount of image distortion is minimized when the above equations (11) and (13) are equal, the angle of incidence θ may be adjusted by the following equation (14):

$$Δθ·(1-\cos φ)/\sin φ/\cos^2 θ=Δα·\cos α·H/R \qquad (14)$$

In other words, the image distortions caused by changing the angle of incidence at the scanner 42 from θ to θ+Δθ (i.e., the left side of equation 14) are set to cancel out with the image distortions caused by changing the angle of incidence at the concave mirror 15 from α to α+Δα (i.e., the right side of equation 14). In should be noted that in equation (14), the terms φ, H, and R are constants as discussed in the first embodiment. Further, the terms α, θ, and Δα are known as discussed above. Then, the only unknown term is Δθ, which may be computed by the controller 10. The controller 10 then operates the optical actuator 43 such that the angle of incidence at the scanner 42 is changed to θ+Δθ that satisfies the equation (14). As a result, new distortions caused by changing the angle of incidence α at the concave mirror 15 are minimized.

Figure 11:
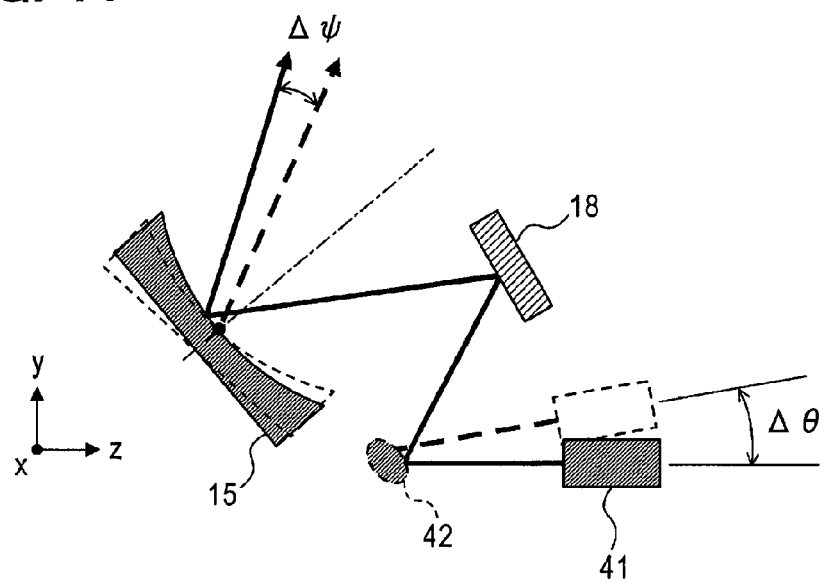
FIG. 11 shows the relationship between change in an angle of incidence at the scanner of FIG. 3 and an angle of emergence of the concave mirror of FIG. 4.

In a first modified aspect of this embodiment, the change in angle Δα may be set to be proportional to the change in angle Δθ, in order to simplify computations by the controller 10. For example, FIG. 11 illustrates a configuration where the change in angle Δα is set to be equal to the change in angle Δθ.

Specifically, when the concave mirror 15 is rotated such that an angle of emergence ψ at the concave mirror 15 is changed by Δψ, the controller 10 operates the optical actuator 43 to change the angle of incidence θ at the scanner 42 by Δθ, such that Δθ equals Δψ. Here, it should be noted that at the concave mirror 15, a change in the angle of emergence ψ implies an equal change in the angle incidence α. In other words, the angle of incidence α at the concave mirror 15 changes by Δα, where Δα, Δψ, and Δθ are all equal.

In this case, equation (14) above may be simplified and expressed in equation (15):

$$(1-\cos φ)/\sin φ/\cos^2 θ=\cos α·H/R \qquad (15)$$

The terms Δα and Δθ are equal, and therefore are canceled out and eliminated from equation (15). Accordingly, it is understood that the initial angles of incidence α and θ, at the default viewpoint 25, must satisfy equation (15). In other words, provided that the default angles of incidence α and θ satisfy equation (15) at the default viewpoint 25, any new distortions caused by changing the angle of incidence α at the concave mirror 15 may be canceled out by simply changing the angle of incidence θ at the scanner 42 by the same angle. As a result, computations by the controller 10 are simplified.

In a second modified aspect of the present embodiment, it is contemplated that a link mechanism (not illustrated) may be used to control the angle of incidence θ at the scanner 42. For example, initially, the angles of incidence α and θ, at the default viewpoint 25, are set to satisfy equation (15) above. Then, a link mechanism may mechanically link the concave mirror 15 and the scanner 42 together, such that a change in the angle of incidence Δα at the concave mirror 15 results in a change in the angle of incidence Δθ at the scanner 42, where Δα equals Δθ.

In other words, the controller 10 only needs to drive the concave mirror actuator 33 to rotate the concave mirror 15, and any new distortions caused by the rotation is automatically canceled by the link mechanism. As a result, the controller 10 does not need to specifically control the optical actuator 43, and computations by the controller 10 are further simplified.

It should be noted that the first and second modified aspects of the present embodiment are not limited to equation (15), which is derived when Δα is set to equal Δθ. It is contemplated that any predictable relationship between Δα and Δθ may be applied, such that Δα is proportional to Δθ. Then, equation (15) above may be re-derived in view of this predictable relationship. As a result, computations by the controller 10 may be simplified.

In addition, while the above embodiments are described with respect to a specular reflection type screen 18, it is also contemplated that screen 18 may be a diffuse reflection type screen, or a transmission type screen.

The scope of the present disclosure is not intended to be limited to the above-described embodiment(s), and a variety of modifications are contemplated.

In the claims, 35 USC 112(f) or 35 USC 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 USC(f) or 35 USC 112(6) is not invoked.

The invention claimed is:

1. A head-up display that projects display light to a projection member, the head-up display comprising:
   a beam generator that emits a beam of light as the display light;
   a scanner including a moveable reflective surface, the scanner receiving the display light from the beam generator and scanning the display light;
   an optical actuator that integrally rotates the beam generator and the scanner to change a scanner angle of incidence of the display light at the scanner;
   a screen that receives the display light from the scanner and reflects the display light;
   a concave mirror that receives the display light from the screen and reflects and expands the display light to the projection member;
   a concave mirror actuator that changes, based on external instructions, a concave mirror angle of incidence of the display light at the concave mirror by rotating the concave mirror; and
   a controller including a CPU and a memory, wherein
   the display light travels between the beam generator, the scanner, the screen, the concave mirror, and the projection member substantially along a common plane, and
   the controller is programmed to drive, based on the concave mirror angle of incidence, the optical actuator to change the scanner angle of incidence such that display light distortions generated at the concave mirror are offset by display light distortions generated at the scanner.

2. The head-up display of claim 1, wherein
   the concave mirror angle of incidence is $\alpha$,
   the scanner angle of incidence is $\theta$,
   the scanner scans the display light, in a horizontal direction orthogonal to the common plane, by a scanning angle $\phi$,
   a radius of curvature of the concave mirror is R,
   a width of the display light in the horizontal direction at the concave mirror is 2H, and
   the controller is programmed to drive the optical actuator to change the scanner angle of incidence to satisfy the following equation:

$\tan \theta \cdot (1-\cos \phi)/\sin \phi = \sin \alpha \cdot H/R$.

* * * * *